United States Patent
Bonnet et al.

(10) Patent No.: US 8,757,579 B2
(45) Date of Patent: Jun. 24, 2014

(54) LINKING DEVICE FOR LINKING A FIRST BODY TO A SECOND BODY, IN PARTICULAR FOR AN AIRCRAFT ENGINE ASSEMBLY

(75) Inventors: Mathieu Bonnet, Toulouse (FR); Benoit Valery, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 206 days.

(21) Appl. No.: 13/184,979

(22) Filed: Jul. 18, 2011

(65) Prior Publication Data

US 2012/0018576 A1   Jan. 26, 2012

(30) Foreign Application Priority Data

Jul. 22, 2010 (FR) .................................. 10 56016

(51) Int. Cl.
   *F16M 13/00* (2006.01)
(52) U.S. Cl.
   USPC ......... 248/554; 244/54; 267/136; 267/140.11
(58) Field of Classification Search
   USPC ............... 244/54, 55; 248/554–557; 188/129, 188/134, 268, 271, 378; 267/136, 140.11
   See application file for complete search history.

(56) References Cited

U.S. PATENT DOCUMENTS

| | | | | | |
|---|---|---|---|---|---|
| 2,936,978 | A | * | 5/1960 | Lauck | 248/555 |
| 4,725,019 | A | * | 2/1988 | White | 244/54 |
| 4,852,533 | A | * | 8/1989 | Doncker et al. | 123/192.1 |
| 5,046,689 | A | * | 9/1991 | Shine | 244/129.4 |
| 5,782,078 | A | * | 7/1998 | Brantley | 60/797 |
| 5,983,778 | A | * | 11/1999 | Dawson | 92/52 |
| 6,029,456 | A | * | 2/2000 | Zaiser | 62/45.1 |
| 6,345,813 | B1 | * | 2/2002 | Trowbridge | 267/64.27 |
| 2009/0166477 | A1 | * | 7/2009 | Bousfield | 244/218 |
| 2009/0286910 | A1 | * | 11/2009 | Bloomfield | 524/269 |
| 2010/0170980 | A1 | * | 7/2010 | Haramburu et al. | 244/54 |

FOREIGN PATENT DOCUMENTS

| | | |
|---|---|---|
| DE | 196 16 944 A1 | 10/1997 |
| FR | 2 599 793 | 12/1987 |
| FR | 2 920 178 | 2/2009 |

OTHER PUBLICATIONS www.freestudy.co.uk, Mathematics for Engineering, Basic Algebra for Areas and Volumes, p. 2 published by D.J. Dunn.*
French Preliminary Search Report issued Mar. 17, 2011, in French 1056016, filed Jul. 22, 2010 (with English Translation of Categories of Cited Documents).
U.S. Appl. No. 13/269,781, filed Oct. 10, 2011, Bonnet, et al.

* cited by examiner

*Primary Examiner* — Rob Swiatek
*Assistant Examiner* — George Andonyan
(74) *Attorney, Agent, or Firm* — Oblon, Spivak, McClelland, Maier & Neustadt, L.L.P.

(57) ABSTRACT

An assembly for connecting a first body to a second body includes a first element having a connection end to the first body and a first tubular portion, and a second element having a connection end to the second body and a second tubular portion extending along the longitudinal axis. The first tubular portion and the second tubular portion are interlocked by at least one complementary tubular portion nested in the first tubular portion and around the second tubular portion. A rigid piece connects the first body to the second body and is fastened to the first and second bodies. One of the first and second bodies is connected with functional play at one of the two attachment points of the rigid connecting piece, wherein the rigid connecting piece is formed of two flat rigid pieces extending on both sides of the first and second elements along the longitudinal axis.

3 Claims, 3 Drawing Sheets

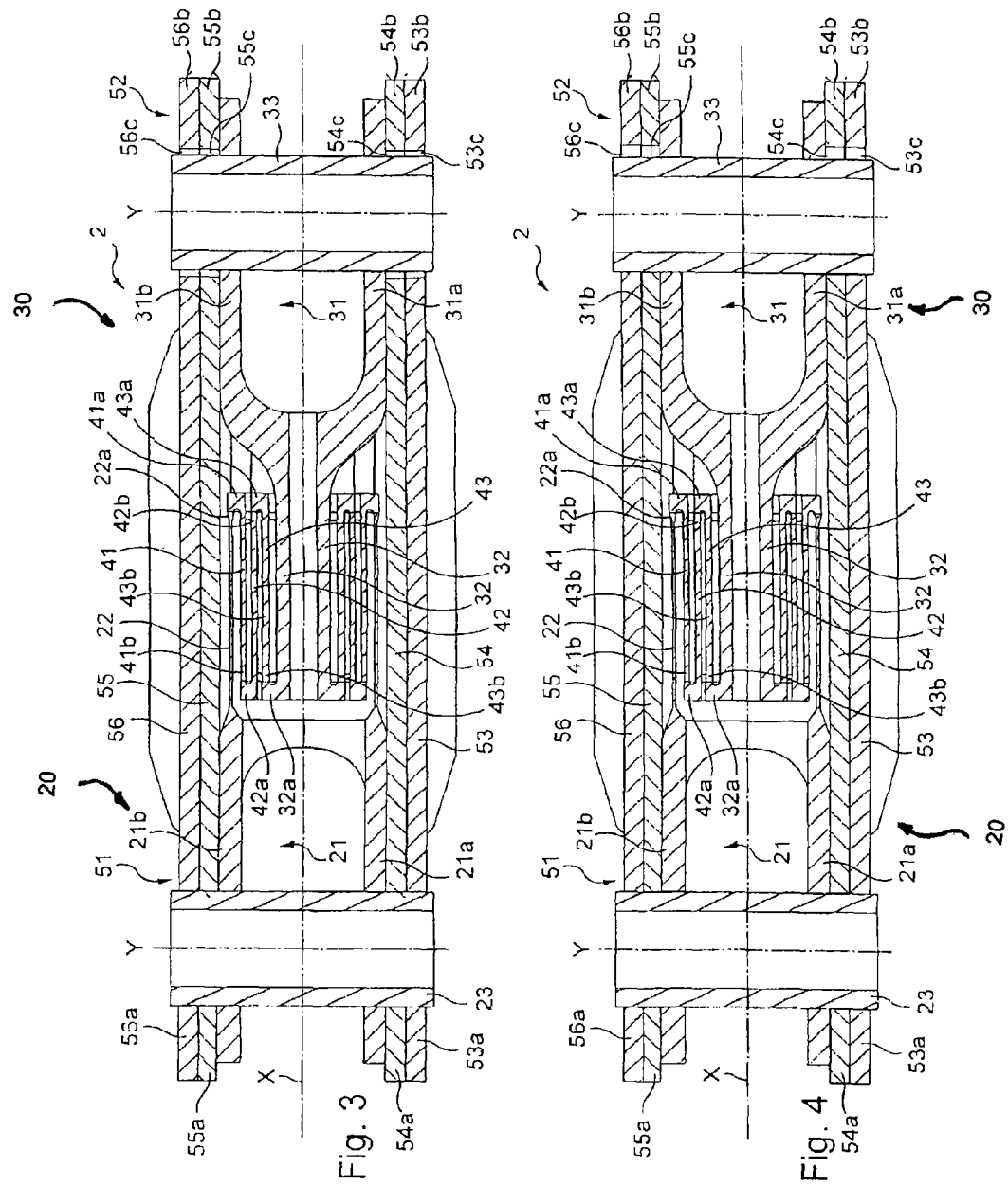

LINKING DEVICE FOR LINKING A FIRST BODY TO A SECOND BODY, IN PARTICULAR FOR AN AIRCRAFT ENGINE ASSEMBLY

CROSS-REFERENCE TO RELATED APPLICATIONS

This application is based upon and claims priority under 35 U.S.C. §119 from French Patent Application No. 10 56016, filed Jul. 22, 2010.

BACKGROUND OF THE INVENTION

Field of the Invention

This invention relates to a connection device intended for connecting a first body to a second body.

More particularly, and in non-limitative manner, this connection device may be part of structural elements intended to connect an engine of an aircraft to the structure of this aircraft, and for example to a mounting pylon of the aircraft.

Such structural elements must withstand very heavy static loads, while maximally reducing the mechanical vibrations transmitted between the connected bodies by the connection device.

The use of pneumatic springs for reducing vibrations is known, using air or another gas, such as nitrogen for example, for acting on an elastic element.

This type of pneumatic spring absorber, however, requires structures for gas introduction and gas-tightness that are complex to implement.

Connection devices comprising rubber or elastomer absorbers also are known.

Such an absorber made of elastomer, however, requires the use of a considerable quantity of material, thus increasing the weight of the connection device, sometimes beyond the stresses acceptable for fitting out an aircraft structure.

Furthermore, the elastomer absorbers may be affected by a change in the properties of the materials used, by creep, distortion or fatigue, so that their absorption feature varies over time.

SUMMARY OF THE INVENTION

This invention has as a purpose to propose a connection device making it possible to create a flexible connection between two bodies to be connected to one another, making it possible to absorb the vibrations by virtue of a special mechanical structure.

In this respect, this invention relates to a device for connection of a first body to a second body, comprising:
- a first element having a connection end adapted for being connected to the first body and comprising a first tubular portion extending along a longitudinal axis; and
- a second element having a connection end adapted for being connected to the second body and comprising a second tubular portion extending along a longitudinal axis, in the first tubular portion of the first element.

According to the invention, the first tubular portion and the second tubular portion are interlocked by at least one complementary tubular portion extending along the longitudinal axis, in the first tubular portion and around the second tubular portion.

Furthermore, in order to obtain tubular portions of uniform rigidity, the first tubular portion, the second tubular portion, and the complementary tubular portion have a surface of identical value in a section crosswise to the longitudinal axis.

In particular, since the tubular portions fitted together have different diameters, the thickness of each tube will be variable so as to obtain a surface of identical value in the cross section of each tube.

In this way, by virtue of a fitting of at least three tubular portions into each other, interlocked with each other, a flexible connection between the bodies to be connected is produced.

In fact, in a device for connection of a first body to a second body by a tubular structure, the length of the tubular part defines the rigidity (or conversely the flexibility) of the connection device.

Thus, the greater the length of the tube forming the connection device, the more flexible and suitable the latter will be for filtering vibrations between the first and the second body connected by the connection device.

By virtue of the fitting together of at least three tubular portions of the connection device, it is possible to obtain a connection device of shorter length, the rigidity (or flexibility) of which is equivalent to a tubular structure the length of which would correspond to the sum of the lengths of the tubular portions fitted into each other.

In this way, the connection device according to the invention makes it possible to compactly create a connection device with a function of absorption of vibrations between the bodies connected by this connection device.

According to a preferred embodiment, the connection devices comprises several complementary tubular portions fitted into each other, the said first tubular portion, second tubular portion and complementary tubular portions being interlocked respectively two by two.

By multiplying the number of tubular portions fitted into each other and interlocked with each other at the ends, it is possible to increase the equivalent length of the connection device in order to enhance the flexibility of this connection device in the filtration of mechanical stresses between the first and second bodies.

The invention also relates to an assembly made up of a first body, a second body and a device for connecting the first body to the second body, the connection device further comprising a rigid piece for connecting the first body to the second body, the rigid connecting piece being fastened at two attachment points respectively to the first and second bodies, one of the first and second bodies being connected by a mechanical attachment with a functional play at one of the two attachment points of the rigid connecting piece.

In this way the rigid connecting piece can take up the stresses between the first body and the second body beyond a limit load so as ensure a rigid connection of the first body to the second body beyond a predetermined value load.

In this way, as long as the loads applied at the connection device remain below the predetermined value load, corresponding for example to fatigue loads, only the first element and the second element of the connection device will transmit stresses, with a filtration of vibrations by virtue of the flexible assembly of the tubular portions fitted together.

When the loads exerted on the connection device exceed the predetermined value load, the functional play provided at the mechanical attachment between one of the first and second bodies and one of the attachment points of the rigid connecting piece will be filled in so that there no longer is any relative movement possible between the rigid connecting piece and the first and second bodies connected by the connection device.

In this way the rigid connecting piece will take up almost all of the stresses to be transmitted between the first body and the second body.

In one embodiment of the invention, the rigid connecting piece of the assembly made up of a first body, a second body and a device for connecting the first body to the second body comprises at least two flat rigid pieces extending on both sides of the first and second elements, along the longitudinal axis.

These flat rigid pieces, also called shackles, make it possible to surround the structure of tubular portions fitted together in order to take up stresses beyond the fatigue loads and ensure a rigid connection between the first body and the second body.

In another embodiment, the rigid connecting piece of the assembly made up of a first body, a second body and a device for connecting the first body to the second body comprises a tube extending along the longitudinal axis around the first and second elements.

Such a tube, also called a connecting rod, makes it possible to uniformly distribute the stresses in the connection device around the longitudinal axis of this connection device.

According to a second aspect, the invention relates to an engine assembly for an aircraft, comprising a mounting pylon and an engine mounted on the pylon by means of a connection device according to the invention.

This invention also relates to an aircraft comprising at least one engine assembly such as defined above.

The engine assembly for an aircraft and the aircraft have characteristics and advantages similar to those described in relation to the connection device according to the invention.

Other features and advantages of the invention also will become apparent in the description below.

BRIEF DESCRIPTION OF THE DRAWINGS

On the attached drawings, given by way of non-limitative examples:

FIG. 3 is a view in longitudinal cross section of the connection device of FIG. 2, the applied loads being less than the fatigue loads; and FIG. 4 is a view similar to FIG. 3, the applied loads exceeding the fatigue loads.

DETAILED DESCRIPTION OF THE INVENTION

Figure 1:
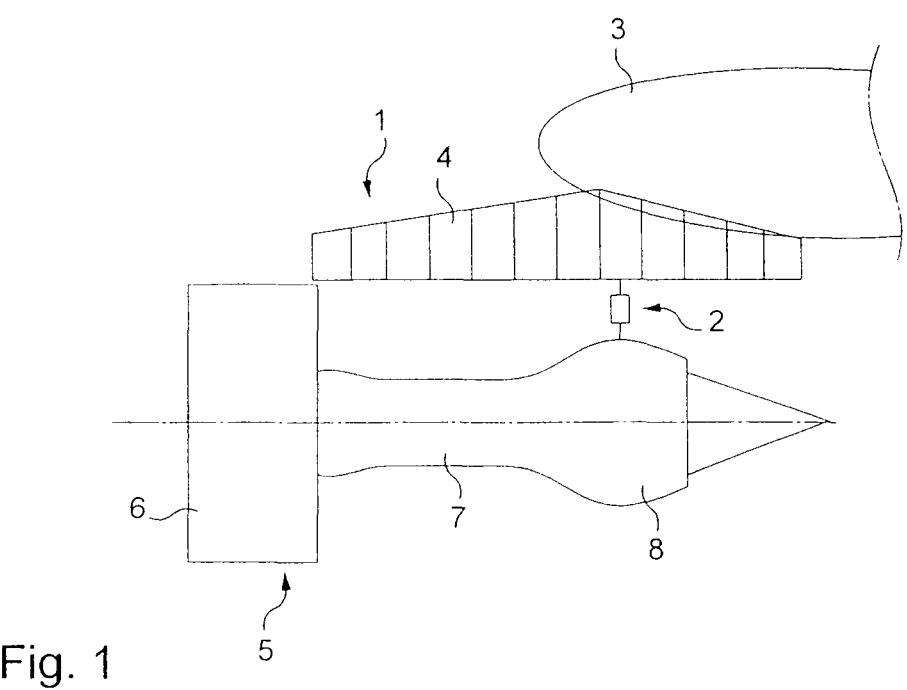
FIG. 1 is a schematic view illustrating an engine assembly for an aircraft according to one embodiment of the invention.

First of all there is going to be described, with reference to FIG. 1, an exemplary embodiment of a connection device 2 applied to an engine assembly 1 for an aircraft.

Engine assembly 1 for an aircraft here, for example, is intended to be fastened beneath a wing 3 of this aircraft, this engine assembly 1 comprising a mounting pylon 4 and an engine such as a turbo-jet engine 5.

A connection device 2 makes it possible to mount turbo-jet engine 5 at mounting pylon 4.

Of course, connection device 2 also could be applied in a configuration in which the engines are mounted at the rear of the fuselage.

In the example illustrated on FIG. 1, turbo-jet engine 5 comprises in the front a large-sized fan housing 6, extended toward the rear of a smaller central housing 7, containing the core of this turbo-jet engine 5.

Finally, central housing 7 extends toward the rear with an ejection housing 8 of smaller size than that of fan housing 6.

Here, connection device 2 is adapted for interlocking turbo-jet engine 5 with mounting pylon 4 at ejection housing 8.

This engine assembly structure will not be described in greater detail here because it is well known to the individual skilled in the art.

Furthermore, the invention is not limited to the exemplary application of a connection device 2 connecting a turbo-jet engine 5 to mounting pylon 4.

The connection device also may be used for connecting the mounting pylon to the fuselage of an aircraft.

Figure 2:
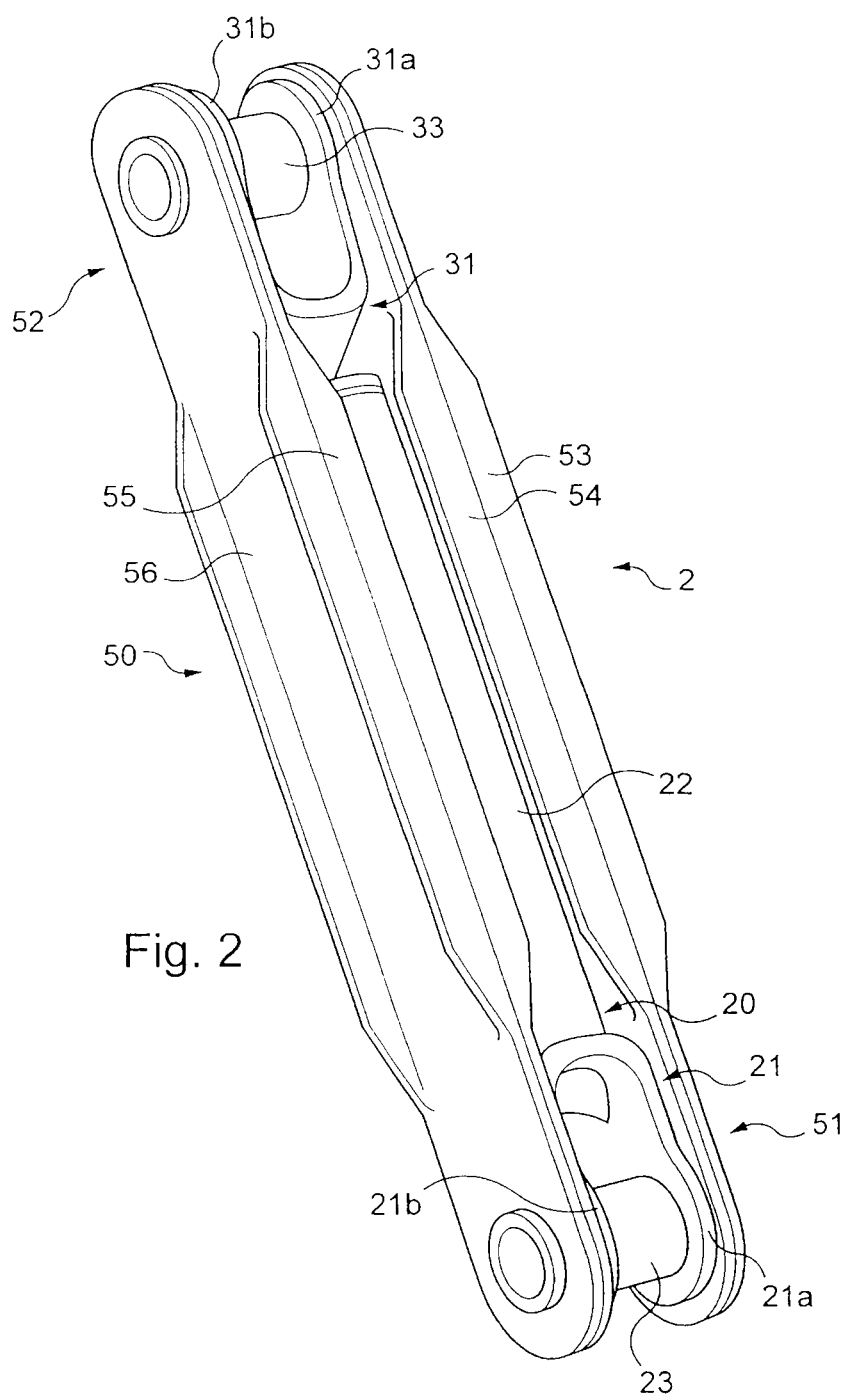
FIG. 2 is a view in perspective of a connection device according to one embodiment of the invention.

There now is going to be described, with reference to FIGS. 2 to 4, a detailed example of an embodiment of connection device 2 such as applied for example on FIG. 1.

In general, this connection device 2 comprises a first element 20 having a connection end 21 adapted for being connected to a first body, and here for example to a mounting pylon 4.

As clearly illustrated on FIGS. 3 and 4 in a view in longitudinal cross section, this first element 20 comprises a first tubular portion 22 extending along a longitudinal axis X of the connection device.

Connection end 21 of first element 20 comprises a clevis 21 adapted for mounting a hinge pin 23 with the first body to be connected, and here, by way of example, mounting pylon 4.

This hinge pin 23 thus extends between the two arms 21a, 21b of U-shaped clevis 21 constituting connection end 21 of first element 20.

Furthermore, this hinge pin 23 extends along a direction Y, perpendicular to the direction of longitudinal axis X of the connection device.

The connection device also comprises a second element 30 also having a connection end 31 adapted for being connected to a second body, and here, by way of example, to turbo-jet engine 5.

This second element 30 comprises a second tubular portion 32 also extending along longitudinal axis X of connection device 2.

As clearly illustrated on FIGS. 3 and 4, this second tubular portion 32 extends into first tubular portion 22 of first element 20.

Connection end 31 of second element 30 also is made up of a clevis 31 adapted for mounting a hinge pin 33 with second body 5.

As for the first element, this hinge pin 33 extends between arms 31a, 31b of U-shaped clevis 31 constituting connection end 31.

This hinge pin 33 also extends along a direction Y, perpendicular to the direction of longitudinal axis X of connection device 2.

Of course, mounting of first element 20 on mounting pylon 4 and of second element 30 on engine 5 may be reversed.

As visible on FIGS. 3 and 4, first tubular portion 22 and second tubular portion 32 are interlocked by several complementary tubular portions, fitted into each other.

In this embodiment, besides first tubular portion 22 and second tubular portion 32, connection device 2 comprises three complementary tubular portions 41, 42, 43.

Of course, this exemplary embodiment is not limitative, connection device 2 being able to comprise only one complementary tubular portion or two complementary tubular portions or a number greater than three.

Irrespective of the number of complementary tubular portions fitted into each other, these tubular portions extend along longitudinal axis X of connection device 2, in first tubular portion 22 and around second tubular portion 32.

As clearly illustrated on FIGS. 3 and 4, tubular portions 22, 32, 41, 42, 43 are interlocked two by two.

In this way, free end 22a of first tubular portion 22 is interlocked with a first end 41a of a third tubular portion 41.

Second end 41b of third tubular portion 41 is in turn interlocked with a first end 42a of a fourth tubular portion 42.

Second end 42b of fourth tubular portion 42 is in turn interlocked with a first end 43a of a fifth tubular portion 43.

Second end 43b of fifth tubular portion 43 is in turn interlocked with free end 32a of second tubular portion 32 of second element 30.

These tubular portions 22, 32, 41, 42, 43 preferably are made of titanium or a nickel-based metal alloy, having appropriate rigidity properties.

All of tubular portions 22, 32, 41, 42, 43 are interlocked two by two for example by welding the ends of these tubular portions.

In this way, the fitting together of the tubular portions makes it possible to obtain a compact connection device having a rigidity (or flexibility) equivalent to that which would be obtained with a tube the length of which would correspond to the sum of the lengths of fitted-together tubular portions 22, 32, 42, 42, 43.

In order to keep to the uniformity of rigidity in all the fitted-together tubular portions, it is preferable for first tubular portion 22, second tubular portion 32 and complementary tubular portions 41, 42, 43 to have in a cross section, that is to say in the plane perpendicular to longitudinal axis X of connection device 2, a surface S of identical values.

In fact, rigidity K of a tubular portion in tension or compression is equal to:

$$K = ES/L$$

With E: Young's modulus, S: area of the cross section of the tubular portion subjected to stresses and L: length of the tubular portion.

Fitted-together tubular portions 22, 32, 41, 42, 43 thus are sized so as to have a surface S of identical value in the cross section of each tubular portion.

In practice, since the diameter of each tubular portion 22, 32, 41, 42, 43 is variable (larger and larger from second tubular portion 32 to first tubular portion 22 passing through complementary tubular portions 43, 42, 41), the thickness of each tubular portion 22, 32, 41, 42, 43 varies inversely, and thus is thinner and thinner from second tubular portion 32 to first tubular portion 22 passing through complementary tubular portions 43, 42, 41.

By way of non-limitative example, the inside diameter of each tubular portion 22, 32, 41, 42, 43 varies between 5 mm and 50 mm.

For example, the inside diameter of first tubular portion 22 varies between 40 and 50 mm, the inside diameter of complementary tubular portion 43 varies between 35 and 45 mm, the inside diameter of complementary tubular portion 42 varies between 25 and 35 mm, the inside diameter of complementary tubular portion 41 varies between 15 and 25 mm and the inside diameter of second tubular portion 32 varies between 5 and 15 mm.

Conversely, the thickness of each tubular portion 22, 32, 41, 42, 43 varies inversely, in a range between 1 mm and 5 mm.

Thus, by way of non-limitative example, the thickness of first tubular portion 22 ranges between 1 and 1.5 mm, the thickness of complementary tubular portion 43 ranges between 1.3 and 1.8 mm, the thickness of complementary tubular portion 42 ranges between 1.6 and 2.2 mm, the thickness of complementary tubular portion 41 ranges between 2.2 and 2.8 mm and the thickness of second tubular portion 32 ranges between 4 and 5 mm.

In this way it is possible, for each tubular portion 22, 32, 41, 42, 43, to choose a pair of values for the inside diameter and the thickness making it possible to obtain a ring-shaped section in the crosswise plane of each tubular portion 22, 32, 41, 42, 43 having a surface of more or less identical value.

Furthermore, the length of each tubular portion is variable and depends on the type of application and use of the connection device.

This length may range between 30 mm and 300 mm.

In the illustrated example, the length of fitted-together tubular portions 22, 32, 41, 42, 43 is more or less identical, and for example ranges between 40 and 70 mm.

Of course, the invention is not limited to this embodiment and the length of the tubular portions could be different from each other.

For example, the length of first tubular portion 22 could be greater than the length of second tubular portion 32, disposed inside first tubular portion 22.

For example, tubular portions 22, 41, 42 could have an identical length, ranging between 200 and 300 mm and tubular portions 43 and 32 could have an identical shorter length ranging between 60 and 100 mm.

By virtue of this fitting together of the tubular portions, the connection device has a flexible performance making it possible to filter the vibrations transmitted between bodies 4, 5 connected by connection device 2.

In the application illustrated on FIG. 1, the mounting of turbo-jet engine 5 on mounting pylon 4 is a source of vibrations in operation.

Connection device 2 thus makes it possible to filter or offset a part of these vibrations by virtue of the flexibility achieved in the mechanical system produced by the fitting together of the tubular portions through which the stresses applied to connection device 2 pass in transit.

Such a connection device 2, however, also must be able to maintain the connection between bodies 4 and 5 even in the case of extreme loads applied to this connection device 2.

For this purpose, as clearly illustrated on FIGS. 2 to 4, the connection device also comprises a rigid piece 50 for connecting the first body, here mounting pylon 4, to the second body, here turbo-jet engine 5.

This rigid connecting piece 5 is fastened at two attachment points 51, 52 respectively to first and second bodies 4, 5.

So as to preserve for the connection device the vibration-filtering feature obtained by virtue of the structure of fitted-together tubes 22, 32, 41, 42, 43, first and second bodies 4, 5 are connected by a mechanical attachment with a functional play at one of attachment points 51, 52 of rigid connecting piece 50.

In this way, by virtue of the presence of this functional play, as long as the stresses or loads exerted on connection device 2 remain below a predetermined value, corresponding to fatigue loads, first and second bodies 4, 5 are connected by connection device 2 allowing a relative movement between rigid connecting piece 50 and the structure of fitted-together tubes 22, 32, 41, 42, 43.

Thus, in this case, the structure of fitted-together tubes 22, 32, 41, 42, 43 takes up all the stresses passing in transit between the two bodies 4, 5 connected by connection device 2, ensuring, as described above, a filtration of the vibrations present at connection device 2.

On the other hand, when the loads applied to connection device 2 exceed fatigue loads, until reaching extreme loads, the functional play provided at the mechanical attachment of rigid connecting piece 50 is filled in so that there no longer is any relative movement between rigid connecting piece 50 and the structure of fitted-together tubes 22, 32, 41, 42, 43.

In this way, rigid connecting piece 50 and the structure of fitted-together tubes 22, 32, 41, 42, 43 are going to take up the stresses proportionally to their rigidity.

Rigid connecting piece 50 is structured so as to take up the entire flow of the stresses between first and second bodies 4, 5 connected by connection device 2 when the loads applied to this connection device 2 exceed the predetermined value corresponding to fatigue loads.

In the embodiment illustrated on FIGS. 2 to 4, rigid connecting piece 50 comprises flat rigid pieces 53, 54, 55, 56, here four in number and extending in pairs on both sides of first and second elements 20, 30, parallel to longitudinal axis X.

Thus two flat rigid pieces 53, 54, also called shackles, extend on a first side of first and second elements 20, 30, and two other flat rigid pieces 55, 56, also called shackles, extend on the other side of first and second elements 20, 30.

The arrangement of two flat rigid pieces 53, 54 and 55, 56 on both sides of first and second elements 20, 30 has the function of ensuring a redundant rigid connection, so as to ensure protection for the transmission of stresses (the system thus has a protection against failures, also called "Fail Safe" in English terminology).

In this way, in the event of breakdown of one of flat rigid pieces 53, 54, 55, 56, the transmission of stresses can be carried out by the remaining flat rigid pieces.

Of course, in the event of breakdown of the flexible connection provided by first and second elements 20, 30 connected by fitted together tubular structure 22, 32, 41, 42, 43, connection device 2 is able to ensure a rigid mechanical attachment by virtue of flat rigid pieces 53, 54, 55, 56 disposed on both sides of the flexible structure.

Each flat rigid piece 53, 54, 55, 56 is in more or less the same form, made up of an elongated plate structure having respectively at each end a bore 53a, 54a, 55a, 56a and 53b, 54b, 55b, 56b intended for mounting flat rigid pieces 53, 54, 55, 56 on first and second bodies 4, 5.

In the embodiment illustrated on FIGS. 3 and 4, flat rigid pieces 53, 54, 55, 56 have attachment points 51, 52 implemented at hinge pins 23 and 33 described above.

The ends of flat rigid pieces 53, 54, 55, 56 thus are disposed on both sides of arms 21a, 21b, 31a, 31b of clevises 21, 31 of the attachment ends of first and second elements 20, 30.

On a first end side, for example end 53a, 54a, 55a, 56a of flat rigid pieces 53, 54, 55, 56, the bore is circular and corresponds more or less to the dimensions of hinge pin 23.

On the other hand, at opposite ends 53b, 54b, 55b, 56b, the bore consists of an oblong hole 53c, 54c, 55c, 56c making it possible to produce the functional play in the mechanical attachment connecting these flat rigid pieces 53, 54, 55, 56 to hinge pin 33 adapted for mounting one of first and second bodies 4, 5, and here for mounting turbo-jet engine 5.

Of course the functional play could be produced in equivalent manner also at hinge pin 23 connecting first body 4, here the mounting pylon.

In this way, at a first attachment point 51 of rigid connecting piece 50, oblong holes 53c, 54c, 55c, 56c allow a mounting with a functional play for hinge pin 33.

In operation, as illustrated on FIG. 3, when the loads applied to connection device 2 remain below a predetermined value load corresponding to the usual fatigue loads applied to the system, the functional play existing at hinge pin 33 allows a relative movement of first and second elements 20, 30 in relation to flat rigid pieces 53, 54, 55, 56.

In this way, the stresses pass in transit at this hinge pin 33 through all the fitted-together tubular structures 22, 32, 41, 42, 43.

On the other hand, as clearly illustrated on FIG. 4, when the loads exerted at hinge pin 33 exceed the arbitrary set limit, corresponding to fatigue loads, the functional play is filled in, hinge pin 33 coming to stop at the end of oblong holes 53c, 54c, 55c, 56c of flat rigid pieces 53, 54, 55, 56.

Considering the relative rigidity of the pieces, the stresses thus are transmitted from hinge pin 33 toward hinge pin 23 through flat rigid pieces 53, 54, 55, 56.

Of course, this invention is not limited to this embodiment.

In particular, rigid connecting piece 50 may comprise a tube extending along longitudinal axis X around first and second elements 20, 30, instead of flat rigid pieces 53, 54, 55, 56.

In this way, first and second elements 20, 30 are accommodated inside an outer tubular structure having at clevises 21, 31, ends of first and second elements 20, 30, a bore for the passage of hinge pins 23, 33, with a functional play at one of hinge pins 23, 33.

The invention claimed is:

1. An assembly composed of a first body, a second body and a device for connecting the first body to the second body, the device for connecting the first body to the second body comprising:
    a first element having a connection end for being connected to the first body and comprising a first tubular portion extending along a longitudinal axis;
    a second element having a connection end for being connected to the second body and comprising a second tubular portion extending along the longitudinal axis, the first tubular portion and the second tubular portion being interlocked by at least one complementary tubular portion extending along the longitudinal axis, the at least one complementary tubular portion being nested in the first tubular portion and around the second tubular portion; and
    a rigid piece for connecting the first body to the second body, the rigid connecting piece being fastened at two attachment points respectively to the first and second bodies, one of the first and second bodies being connected by a mechanical attachment with a functional play at one of the two attachment points of the rigid connecting piece, wherein the rigid connecting piece comprises at least two flat rigid pieces extending on both sides of the first and second elements along the longitudinal axis.

2. The assembly according to claim 1, wherein the connection device comprises several complementary tubular portions nested with each other, the first tubular portion, second tubular portion and complementary tubular portions being attached in series with each other.

3. The assembly according to claim 1, wherein the connection device is made of titanium or a nickel-based metal alloy.

* * * * *